United States Patent
Gostomski

[15] 3,638,746
[45] Feb. 1, 1972

[54] MOTORCYCLE HAVING TWO TANDEM DRIVING WHEELS

[72] Inventor: Lawrence A. Gostomski, Thorp, Wis.
[73] Assignee: Right-Way Mfg. Corp., Owen, Wis.
[22] Filed: July 27, 1970
[21] Appl. No.: 58,359

[52] U.S. Cl. .............................. 180/25 R, 180/32, 180/33 R
[51] Int. Cl. ........................................................ B62k 5/00
[58] Field of Search .................. 180/25 R, 25 A, 31, 33 R, 5, 180/9.24, 24.13, 21, 24.02, 24.11

[56] References Cited

UNITED STATES PATENTS

| | | | |
|---|---|---|---|
| Re.26,775 | 1/1970 | Smieja | 180/5 |
| 1,824,975 | 9/1931 | Ahlm et al. | 180/24.13 |
| 2,339,886 | 1/1944 | Shannon | 180/5 |
| 3,158,220 | 11/1964 | Griffith | 180/9.24 |
| 3,193,039 | 7/1965 | Sutton | 180/25 |
| 3,224,523 | 12/1965 | Ross | 180/25 |
| 3,318,403 | 5/1967 | Hansen | 180/5 |

Primary Examiner—Kenneth H. Betts
Attorney—Burd, Braddock & Bartz

[57] ABSTRACT

A three-wheeled motorcycle for use on rough terrain has a main frame and a front guide wheel pivotally mounted thereto. A pair of linkage arms are pivotally mounted at front ends to an intermediate point on the main frame. Rear ends of these arms pivotally support a wheel support frame including a pair of parallel spaced-apart bolsters. Two rear wheels are tandem mounted between the bolsters, the axle carrying the forward wheel of the pair forming the pivot for the connection between the arms and the bolsters, and the axle for the rear wheel of the pair being carried in bearings at rear ends of the bolsters. A pair of parallel, substantially vertical main frame support links are pivotally mounted to the wheel support frame at the bolsters one-third of the bolster length from the rear thereof and are pivotally mounted to the main frame substantially directly above the connection to the wheel support frame. A positive chain drive is provided from sprockets pivotally mounted concentrically with the mounting point of the linkage arms to the main frame to sprockets driving on said wheel axles. Means is provided for limiting downward pivotal movement of the linkage arms during steep hill climbing use of the vehicle on rough terrain.

8 Claims, 5 Drawing Figures

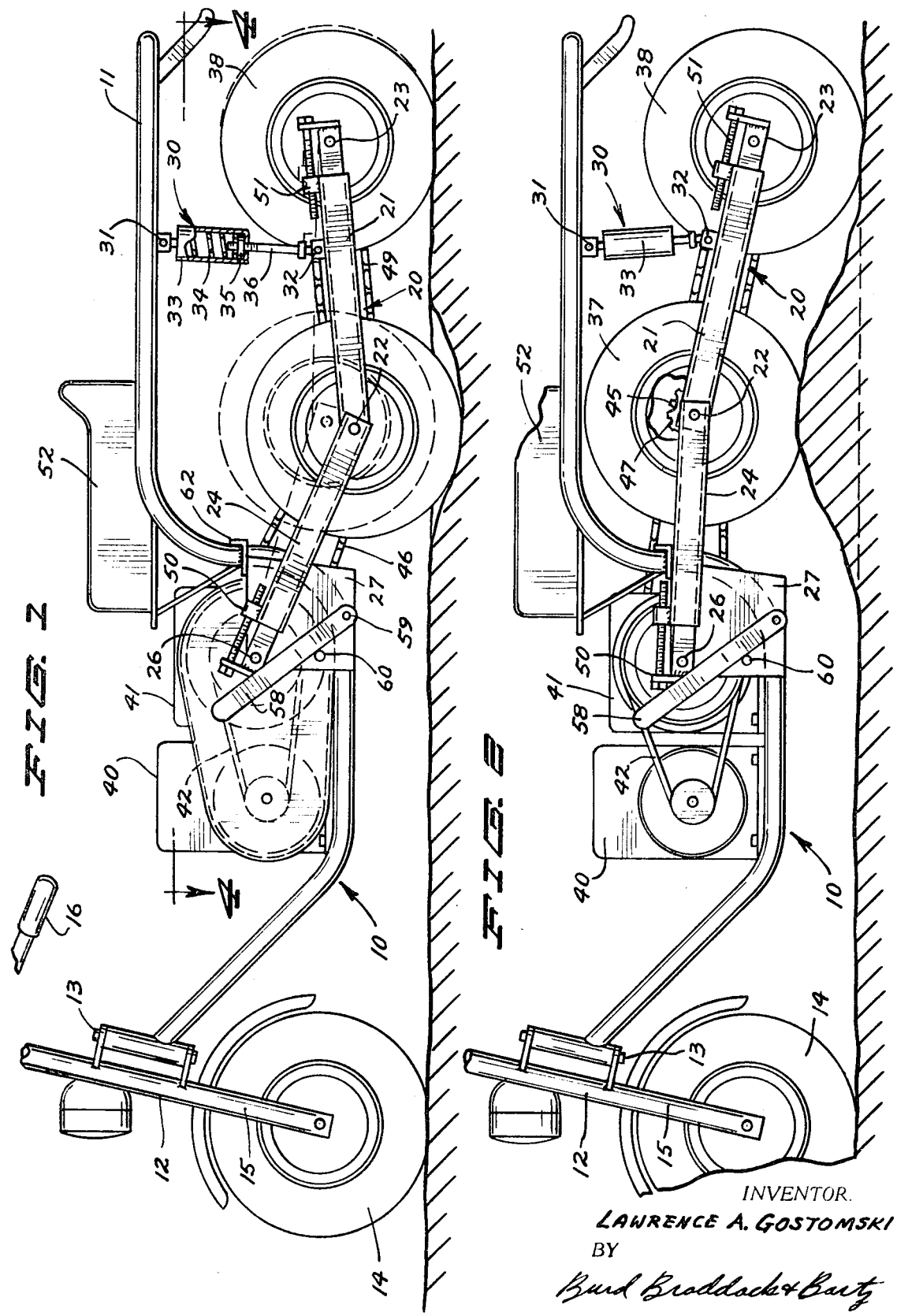

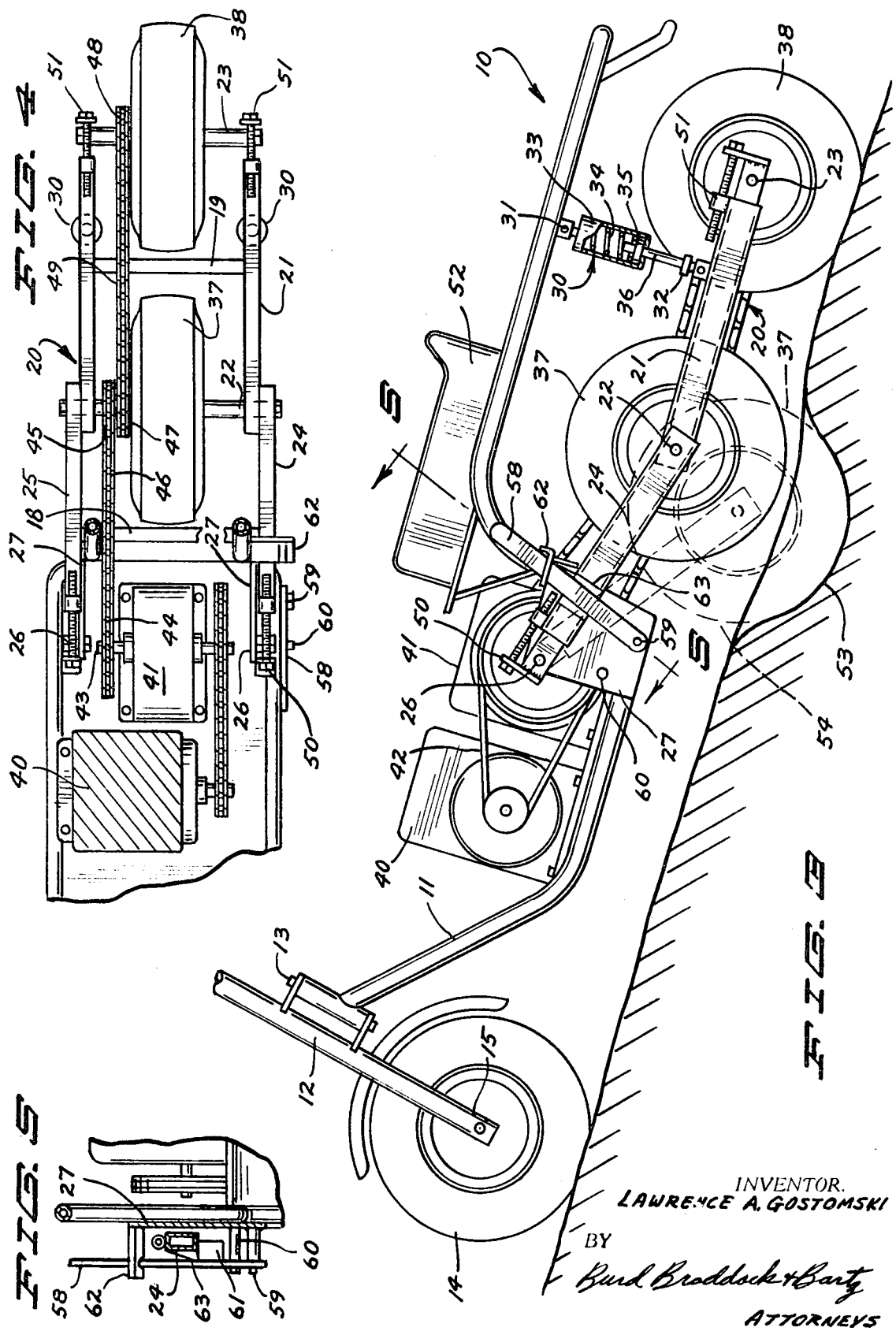

MOTORCYCLE HAVING TWO TANDEM DRIVING WHEELS

BACKGROUND OF THE INVENTION

This invention relates to a power-wheeled vehicle having two tandem driving wheels and one pivotable guiding wheel, the combination being particularly useful for traversing rough terrain.

Regular two-wheeled motorcycles are subject to the disadvantage that on encountering rough terrain at high speeds, the rear drive wheel thereof tends to leave the ground at the top of bumps or other inclines, and tends to ride freely through the air away from the ground when it runs over holes. In an attempt to maintain a driving wheel in connection with the ground at substantially all times, three wheeled tandem mounted motorcycles have been proposed.

It is known to tandem mount two wheels on a horizontal frame and to pivotally mount such a frame on the rear of a motorcycle-type vehicle. Providing driving traction to each of the tandem mounted wheels is also known. See the patent to Ross, U.S. Pat. No. 3,224,523 and the patent to Sutton, U.S. Pat. No. 3,193,039. Such structures tend to reduce the amount that the rear of the motorcycle frame will raise or lower when a bump or a hole is encountered in comparison to the amount which the rear part of the frame of a motorcycle will raise or lower when there is only one wheel at the rear thereof. However, in these prior art patents, the wheels, on their pivoted frame, are limited by the amount of "teeter-totter" action permitted by the relationship between the pivoted frame and the main frame.

In an effort to improve the stability of motorcycles and to keep a driving force on the ground at all times, the patent to Griffith, U.S. Pat. No. 3,158,220, discloses an endless track running over a pair of tandem mounted wheels on a wheel frame which is pivotally mounted at a front end thereof to the rear frame of a motorcycle-type vehicle. Use of the endless track, of course, increases the area of contact between the driving force and the ground, but there is absolutely no saving in the up and down action at the rear of the motorcycle or scooter inasmuch as one of the wheels is pivoted at the point that the frame is pivoted to the axis.

While all of these structures have been designed to try to keep at least one rear wheel of a motorcycle in contact with the ground at all times, they fall short of minimizing the up and down motion of the rear frame of the motorcycle over rough terrain.

All two-wheeled and three-wheeled motorcycles before the present invention were subject to a difficulty when riding over an obstruction, for example when encountering a fallen log, in that the powered wheel tends to force the front wheel directly into and through the obstruction, making it necessary for the rider to have to physically lift at least part of the weight of the front of the cycle to get the front wheel to start over the obstruction.

Motorcycles of the prior art are also subject to "high centering" when climbing steep hills. That is, the front end tends to ride up over the center of gravity during steep hill climbs as the power to the rear wheel causes changes to the dynamic center of balance. In extreme situations when the front end gets too high, the rear wheel will run right under the motorcycle and tend to deposit the rider on his back with the cycle on top of him.

SUMMARY OF THE INVENTION

In order to increase further the percentage of the time that a drive wheel is in driving contact with the ground while riding a vehicle over rough terrain, and in order to minimize the amount and rapidity of up and down movements, and in order to overcome the difficulties set out above, the tandem wheeled vehicle of the present invention was developed.

In a vehicle made according to the present invention, tandem-driving wheels are mounted on a wheel support frame, and this wheel support frame is pivotally mounted to linkage arms which are pivotally mounted to a central portion of a main frame of the vehicle. A substantially vertical main frame support link is pivotally mounted from a position on the wheel support frame one-third of the way from the rear end thereof toward the front, and this link is also pivotally mounted to the main frame of the vehicle substantially directly over the point of its mounting to its wheel support frame. A shock absorbing device is shown as being incorporated in this linkage.

This structure will allow the forwardmost of the tandem mounted wheels to drop a substantial distance into a hole, for example, as the vehicle moves over rough terrain, while the rear end of the vehicle will be supported on the rear wheel and with a minimum of downward movement of the rear portion of the frame. When the forward wheel hits the bottom of the hole, it will start to come up, and by the time the rear wheel drops off into hole, the distance that the rear frame of the machine drops will be determined by the positioning of the forward wheel as it begins to climb out of the hole.

Similarly, as the tandem wheels hit a rise or a bump, and the forward wheel is first pushed up, the rise caused in the rear portion of the machine will be minimized because the link is connected near the back of the bolster frame, and if the forward wheel is going down the other side of the bump by the time the rear wheel reaches the bump, the total upward distance of the rearwardmost part of the frame will be something less than the distance which it would be raised in the event the rear wheel was mounted directly on the frame, for example.

In either case, one of the wheels is in driving relationship with respect to the ground at all times.

The wheel suspension of the present invention allows the forwardmost of the tandem mounted wheels to drop very substantial distances in a downward direction, and when the machine is proceeding generally on the level or going down a slope, this is an advantage. When climbing at any appreciable angle, however, falling deep into a hole will put the forward wheel in a relationship where efficient forward motive power is greatly reduced and this wheel will tend to dig and climb at too steep an angle to be efficient. To alleviate this condition in hill climbing, some contact with the ground on the part of the forward wheel is sacrificed by providing a means for interrupting the downward pivotal movement of the linkage bar, thus limiting the maximum downward movement of the forward wheel. In this situation, the downward movement of the wheel will be such that the bolster frame does not move substantially below horizontal so that a maximum bridging effect between the rear wheel and the forward wheel is obtained. Thus, the forward wheel will be lowered into contact with the hole only after the rearward wheel moves over the top edge of the hole, and the forward wheel will not have the tendency to dig as pointed out above.

Also, the tendency toward high centering is substantially reduced or eliminated by this provision for limiting downward movement of the linkage arms, and hence the front end of the wheel supported frame. When the front end of the cycle tends to ride up or "high center," the rearward most tandem mounted wheel will be the only one in driving contact with the ground. Hence the effective center of gravity and dynamic balance point will be far ahead of this point of driving ground contact and the cycle will tend to ride with its front wheel in contact with the ground.

BRIEF DESCRIPTION OF THE DRAWINGS

FIG. 1 is a side elevational view of a tandem-wheeled vehicle of the present invention as it will appear when traveling on uneven terrain, but with certain parts of a standard handlebar construction omitted in order to conserve space;

FIG. 2 is a side elevational view of the vehicle of FIG. 1 but showing the relationship of the parts as the tandem mounted wheels roll over a bump on uneven terrain;

FIG. 3 is a side elevational view similar to that seen in FIG. 1, but showing the relationship of the parts as the tandem mounted wheels encounter a hole as the vehicle is climbing up an incline;

FIG. 4 is a fragmentary generally horizontal elevational view taken on the line 4—4 of FIG. 1; and FIG. 5 is an enlarged sectional view taken on the line 5—5 of FIG. 3.

DESCRIPTION OF THE PREFERRED EMBODIMENT

A tandem-wheeled vehicle 10 includes a main frame 11 to which a steering assembly 12 is pivotally mounted as at 13. The steering assembly includes a guide wheel 14 rotatably mounted in steering fork 15 which is controlled by handlebars 16.

In the invention as shown, a wheel support frame 20 is made up of parallel bolsters 21,21, a forward axle 22, rear axle 23, a forward crossbar 18 and a rear crossbar 19. The bolsters and the crossbars form a rigid frame. If desirable, gusset plates (not shown) can be welded to these bars and bolsters where they are joined to increase this rigidity. Also pivotally mounted on the forward axle 22 are a pair of linkage arms 24 and 25. These linkage arms are also pivotally mounted as at 26 to a gusset plate 27 which is integral with and forms a part of the main frame 10. A main frame support link 30 is pivotally mounted to the main frame as at 31 and is pivotally mounted to the wheel support frame 20 on bolsters 21,21 as at 32. This link is made up, as shown, of a casing 33 pivoted to the main frame, as at 31, a compression spring 34, a spring engaging plate 35, and a threaded stem 36 threadably and adjustably mounted in the plate 35 and pivotally connected to the bolster frame 20 as at 32.

A forward tandem mounted wheel 37 is rotatably mounted on the axle 22, and a rear tandem mounted wheel 38 is rotatably mounted on the axle 23.

A motor 40 is mounted on the main frame and is operably connected to a transmission 41 as at 42. A drive shaft 43 out from the transmission 42 is on the same axis as is the pivot point 26 between linkage arms 24 and 25 and the main frame. A sprocket 44 on drive shaft 43 is drivably connected to a sprocket 45 on forward axle 22 through the instrumentality of a drive chain 46. This sprocket 46 drives an additional sprocket 47 and also the forward wheel 37 through the instrumentality of the axle 22. Sprocket 47 drives sprocket 48 on the axle 23, through the instrumentality of drive chain 49, and the axle 23 drives the rear wheel 38.

Length adjustment mechanisms 50 and 51 are provided to adjust the effective length of the linkage arms 24 and 25 and of the bolsters 21,21, respectively, to the end that the chains 46 and 49 are properly tensioned.

As will be understood from a consideration of the figures, when the vehicle of the invention is operating on smooth and even ground, the positioning of the main frame support 30 closer to the rear axle 23 than to the forward axle 22 will cause more of the weight of the vehicle to be supported on rear wheel 38 and on forward wheel 37. Experiments with the positioning of the pivot point 32 have so far revealed that an optimum spacing along the bolsters 21 is with two-thirds of the bolster lying between forward axle 22 and the pivot point 32 and one-third of the bolster lying between this pivot point and the axle 23. Both wheels are power driven, but this puts the maximum traction back at the rear wheel when smooth roadway is being encountered either on the level or going up or down hill.

Referring now to FIG. 2, when a small "hill" or bump is encountered, the more lightly loaded wheel 37, pivoting with linkage arms 24 and 25 around point 26, raises with respect to the main frame, and this upward movement forces the support link 30 slightly upwardly as well. It is to be understood that once the forward wheel 37 starts rolling down the other side of the bump, the main frame will start to lower again until such time as the rear wheel 38 begins to encounter the bump. In the situation shown in FIG. 2, this will happen substantially simultaneously. As the forward wheel goes down, there is a tendency for the frame to lower and as the rear wheel goes up, there is an overriding tendency for the frame to be raised. The amount that the rear end is raised at the time the rear wheel is on top of the bump is, of course, less than the amount a standard motorcycle would be raised with only the rear wheel pivotally mounted to the main frame. This is because the forward wheel is down and the bolsters will be located below the rear axle 23.

As seen in FIG. 1, when the vehicle encounters the hole in the road when on level ground, the reverse action will take place and the forward wheel 37 will drop into the hole and lower the rear part of the main frame slightly but the rear wheel will prevent substantial lowering thereof. Assuming that the forward wheel bottoms in the hole and starts to come up the other side at about the time the rear wheel drops into the hole, the total drop of the rear end of the frame will be minimized. Also, as the rear wheel drops, the forward wheel will have good traction and will substantially take over the drive of the vehicle until such time as the rear wheel again has most of the weight on it.

It will be seen from the above that the length of time from the first raising or lowering of the rear of the main frame until the machine is again on the level has been increased, thus reducing the severity of the shock due to going over the bump or hole. Also, the maximum height or depth of movement of the rear of the vehicle has been reduced because of the pivot of the wheel support frame about the pivot point 32 and because of the relative freedom from constriction of the wheel support frame and tandem mounted wheels growing out of the pivotal connection between the forward edge of the wheel support frame and the main frame of the machine through the linkage arms 24 and 25. In this connection, note that the main frame support link 30 is pivoted not only to the wheel support frame at 32 but also to the main frame at 31 so that it can swing as necessary to accommodate the swinging movement of the wheel support frame about the pivot point 21 and the axle 22.

A further advantage is the spring mounting which is included in the support link, thus further minimizing shock to a rider who will be positioned on a seat 52 fixedly mounted on the main frame 11. It is to be understood that this compression spring mounting could be augmented by utilizing a piston-cylinder dash pot arrangement of the type generally referred to as a "shock absorber."

Although not shown, when the guide wheel 14 must traverse an obstruction of substantial height, for example, a curbing or fallen log, this wheel will be brought into contact with the obstruction and the throttle opened slightly. Assuming the obstruction hits the guide wheel at a point lower than axle height there will be component of lifting force generated tending to lift the guide wheel over the obstruction. Since most of the tandem supported weight is on the rear wheel, the center of gravity will be substantially behind that of a similar two wheeled cycle or a tandem cycle having a wheel support frame pivotally mounted to the main frame. Therefore, a lesser lifting action is needed at the point of contact of the obstruction with the guide wheel to climb over the obstruction. The net result is that the resultant driving force from the rear wheels seems to act through the linkage arms 24 and 25 to push the front wheel up and over the obstruction.

The progress of the cycle over soft or swampy terrain is likewise aided by this structure. The weight on the rear driving wheel increases the traction thereon, and moves back the effective center of gravity so that lesser force is required to lift the guide wheel as it passes along in soft mud, and lesser weight is supported by the forward tandem wheel. The net result is less drag on the front wheels.

In one set of conditions, this free wheeling action of the wheel support frame, particularly in allowing the forward wheel 37 to drop low, has proved to be not advantageous. This is the situation where the motorcycle is being driven up an incline as illustrated in FIG. 3. Here the forward wheel 38, if unrestricted, would drop into a hole such as indicated at 53 to have position as shown in dotted lines at 54. As seen, wheel 37 would have a disadvantageous position as far as utilizing the wheel traction, and would tend to dig in and substantially retard the forward progress of the machine and/or cause a severe jolt to the rider.

Furthermore, in this situation, the forward wheel 37 will carry a substantially large part of the tandem supported weight. With the guide wheel already elevated, the center of gravity and the dynamic point of balance will move dangerously close to vertical alignment with this forward wheel and a strong tendency toward high centering will be present.

For these reasons, a manually operated limit arm 58 is pivotally mounted as at 59 to the gusset plate 27 of the main frame 11. In its forward, nonoperative position, as seen in FIGS. 1, 2 and 4, it rests on a limit pin 60 extending outwardly from gusset plate 27.

As best seen in FIG. 5, limit arm 58 is provided with a stop bracket 61 extending outwardly therefrom in a direction toward the machine. Stop bracket 61 is in position to interrupt the downward movement of the linkage arm 24 when the limit arm is positioned as seen in FIG. 3 and is resting in a support bracket 62.

Thus, it will be seen that when climbing hills, the operator will position the manually operated limit arm as seen in FIG. 3, so that the forward wheel 37 cannot move substantially below the plane of the supporting surface when the supporting surface is level. Then, when a hole such as the hole 53 is encountered, the linkage arm 24 will rest on the stop bracket 61, and the rear wheel 38 will support the entire weight of the rear portion of the machine until such time as it runs off the edge of the hole or the forward wheel 37 again comes in contact with the terrain, whichever happens first. As soon as the forward wheel 37 contacts the terrain, it will be in position to support the rear portion of the machine and to take over the drive as the rear wheel 38 drops into the hole. Note, however, that the forward wheel is, at that point, free to swing in an upward direction as the rear wheel moves down, thus still minimizing the distance moved by the rear portion of the main frame, lengthening out the time period of the movement due to the encounter with the hole and reducing the severity of the shock occasioned thereby.

Since with the limit restricting downward movement of the forward wheel, the rear wheel 38 is the only one in contact with the ground when the guide wheel leaves the ground in hill climbing, the maximum distance between the dynamic point of balance and the rear wheel is maintained and the tendency to high centering is thus reduced.

While the invention is disclosed in connection with a three-wheeled vehicle, it is to be understood that the principles would still apply if more than one set of tandem mounted wheels were attached to the rear portion of the main frame. For example, a powered vehicle, similar to a golf cart, could have a single front pivoted guide wheel and two sets of tandem mounted rear wheels each situated in a separate horizontal plane parallel with the plane of the other and mounted to opposite sides of a vehicle. These sets of tandem wheels could operate independently of each other and could, in addition to having the advantages set out for the three-wheeled vehicle, also minimize the sideward rocking action caused by traversing over rough terrain where different obstructions and holes are aligned with the different sets of tandem mounted wheels.

The embodiments of the invention in which an exclusive property or privilege is claimed are defined as follows:

1. A tandem-wheeled vehicle including a main frame, a front guide wheel assembly on the main frame, a wheel support frame, a forward wheel rotatably mounted on a forward end of the wheel support frame, a rear wheel rotatably mounted on a rear end of the wheel support frame, a linkage arm pivotally mounted at a forward end to an intermediate portion of the main frame and at a rear end to the forward end of the wheel support frame, a main frame support link pivotally mounted at a bottom end to an intermediate portion of the wheel support frame and at a top end to the main frame, and means carried by said vehicle to drive said forward and rear wheels.

2. The combination as specified in claim 1 wherein said support link includes a resilient, shock-absorbing member between the top and bottom pivotal mountings.

3. The combination as specified in claim 1 wherein: said linkage arm pivots at said rear end on an axis coincident with the axis of rotation of said forward wheel; and said drive means includes a prime mover mounted on said main frame, a drive train mounted on the main frame including a pulley rotatably mounted on the axis of the pivotal connection between the linkage arm and the main frame, pulleys mounted on the axis of each of said tandem mounted wheels and each drivably connected to its wheel, and drive belt means drivably connecting said wheel pulleys to said pulley on said main frame.

4. The combination as specified in claim 3 wherein said support link is pivoted to the main frame at position substantially directly above its pivotal connection to said wheel support frame.

5. The combination as specified in claim 4 wherein said support link includes a shock-absorbing member between said top and bottom pivotal mountings.

6. The combination as specified in claim 5 wherein said support link is pivotally connected to said wheel support frame about one-third of the way from the rear wheel axis toward the front wheel axis.

7. The combination as specified in claim 5 and disengageable means to prevent downward movement of said forward wheel below a predetermined distance under said rear wheel.

8. The combination as specified in claim 7 wherein said disengageable means includes a limit arm pivotally mounted on the main frame and a stop bracket integral with and extending from said limit arm, said limit arm being movable between a first limiting position where said stop bracket is in interfering, limiting relation to downward movement of said linkage arm and a second position where the stop bracket is in clearing, noninterfering relation to the movement of the linkage arm.

* * * * *